US008755316B2

(12) United States Patent
Aschan et al.

(10) Patent No.: US 8,755,316 B2
(45) Date of Patent: Jun. 17, 2014

(54) COORDINATION OF DRX AND EICIC (75) Inventors: Kennett Aschan, Helsinki (FI); Tero Henttonen, Espoo (FI)

(73) Assignee: Broadcom Corporation, Irvine, CA (US)

(*) Notice: Subject to any disclaimer, the term of this patent is extended or adjusted under 35 U.S.C. 154(b) by 219 days.

(21) Appl. No.: 13/209,624

(22) Filed: Aug. 15, 2011

(65) Prior Publication Data

US 2013/0045770 A1 Feb. 21, 2013

(51) Int. Cl.
H04B 1/38 (2006.01)
(52) U.S. Cl.
USPC ........... 370/311; 370/310; 370/345; 370/347; 370/312
(58) Field of Classification Search
USPC .......... 370/310–312, 345–347, 321, 329; 455/500, 514–514, 422.1, 343.1
See application file for complete search history.

(56) References Cited

U.S. PATENT DOCUMENTS

| 8,483,624 | B2* | 7/2013 | Cai et al. ................. 455/73 |
| 2007/0291728 | A1* | 12/2007 | Dalsgaard et al. ............ 370/347 |
| 2009/0232118 | A1* | 9/2009 | Wang et al. .................. 370/338 |
| 2010/0137013 | A1* | 6/2010 | Ren .............................. 455/500 |
| 2010/0172340 | A1* | 7/2010 | Muharemovic et al. ...... 370/350 |
| 2011/0026462 | A1* | 2/2011 | Montojo et al. .............. 370/328 |
| 2011/0294491 | A1* | 12/2011 | Fong et al. ................. 455/422.1 |
| 2012/0113920 | A1* | 5/2012 | Cheng et al. ................... 370/329 |
| 2012/0115469 | A1* | 5/2012 | Chen et al. .................... 455/434 |
| 2012/0155362 | A1* | 6/2012 | Montojo et al. ............... 370/312 |
| 2012/0157082 | A1* | 6/2012 | Pedersen et al. ........... 455/422.1 |
| 2012/0307744 | A1* | 12/2012 | Charbit et al. ................ 370/329 |

OTHER PUBLICATIONS

3GPP TS 36.321 V10.2.0 (Jun. 2011), Technical Specification, 3rd Generation Partnership Project; Technical Specification Group Radio Access Network; Evolved Universal Terrestrial Radio Access (E-UTRA); Medium Access Control (MAC) Protocol Specification (Release 10), (pp. 1-7 and 29-30).

(Continued)

Primary Examiner — Dang Ton
Assistant Examiner — Sai Aung
(74) Attorney, Agent, or Firm — Stanton IP Law (57) ABSTRACT An active reception period (active time) of a power saving pattern (DRX) is masked to a measurement period (ABS) of a serving or neighbor cell interference mitigation pattern (eICIC) such that the masked active reception period repeatedly coincides with the measurement period. Then the masked active reception period is utilized for communicating resource allocations (PDCCHs) between a serving cell (eNB) and a user equipment (UE). In various embodiments: the masking is done without shortening a sleep opportunity (DRX opportunity) of the power saving pattern; the masking is implemented by delaying an on-duration start time of the active reception period; the on-duration start time is controlled by a timer which runs only during measurement periods of the interference mitigation pattern, or by applying a second offset generated by the UE in addition to applying a first offset configured by the serving cell; and the masking is by adopting a default power saving pattern.

20 Claims, 5 Drawing Sheets (56) References Cited

OTHER PUBLICATIONS

3GPP TS 36.133 V10.3.0 (Jun. 2011), Technical Specification, 3$^{rd}$ Generation Partnership Project; Technical Specification Group Radio Access Network; Evolved Universal Terrestrial Radio Access (E-UTRA); Requirements for Support of Radio Resource Management (Release 10), (pp. 1-16 and 45-100).

Huawei et al: "Consideration on DRX in eICIC scenario", 3GPP Draft; R2-111021, 3rd Generation Partnership Project (3GPP), vol. RAN WG2, no. Taipei, Taiwan; 201101' Feb. 14, 2011 XP050493546, [retrieved on Feb. 14, 2011] Item 1-Item 3.

Renesas Electronics Europe: 'Power considerations for eICIC measurement' 3GPP Draft; R4-110340, Jan. 11, 2011, XP050500303, figures 2-6.

Renesas Electronics Europe: Remaining 3GPP Draft: R2-110490 Remaining Work for eICIC in Rel'10, 3rd Generation Partnership Project (3GPP), vol. RAN WG2, no. Dublin; 20110117-20110121, Jan. 11, 2011, XP050605611, [retrieved on Jan. 11, 2011], the whole document.

\* cited by examiner

```
CQI-ReportConfig-v920 ::=   SEQUENCE {
    cqi-Mask-r9             ENUMERATED {setup} OPTIONAL,  -- Cond cqi-Setup
    pmi-RI-Report-r9        ENUMERATED {setup} OPTIONAL   -- Cond PMIRI
}
```

FIG. 1A
PRIOR ART

| DRX CYCLE LENGTH (s) | $T_{identify\_intra\_eICIC}$ (s) (DRX CYCLES) |
|---|---|
| ≤0.04 | [1] (NOTE1) |
| 0.04<DRX-CYCLE≤0.08 | NOTE2 ([53]) |
| 0.128 | [4.22] ([33]) |
| 0.128<DRX-CYCLE≤2.56 | NOTE2 ([28]) |
| NOTE1: NUMBER OF DRX CYCLE DEPENDS UPON THE DRX CYCLE IN USE | |
| NOTE2: TIME DEPENDS UPON THE DRX CYCLE IN USE | |

COORDINATION OF DRX AND EICIC

TECHNICAL FIELD

The exemplary and non-limiting embodiments of this invention relate generally to wireless communication systems, methods, devices and computer programs and, more specifically, relate to aligning in time a power saving schedule such as a UE's DRX and an interference suppression schedule such as almost blank subframes of an eICIC arrangement.

BACKGROUND

The following abbreviations that may be found in the specification and/or the drawing figures are defined as follows:
  3GPP third generation partnership project
  ABS almost blank subframe
  CA carrier aggregation
  CE control element
  CQI channel quality indicator
  CRS common reference signal
  DRX discontinuous reception period
  DL downlink
  E-UTRA evolved universal terrestrial radio access
  eICIC enhanced inter-cell interference coordination
  eNB evolved NodeB (base transceiver station in LTE/LTE-A)
  HARQ hybrid automatic repeat request
  LTE long term evolution (evolved UTRAN)
  LTE-A LTE-advanced
  MAC medium access control
  PDCCH physical downlink control channel
  PDSCH physical downlink shared channel
  PHY physical (logical layer)
  PUSCH physical uplink shared channel
  RLM radio link measurements
  RRC radio resource control
  RRM radio resource measurements
  RSRP reference signal received power
  RTT round trip time
  UE user equipment
  UL uplink Various different wireless radio access technologies specify procedures which are primarily directed toward managing power consumption in user devices which have a limited power supply (for example, galvanic/battery or fuel cell). LTE Release 8 includes the concept of DRX, a per-UE schedule known to both the network and the UE by which the network schedules it DL signaling of radio resource allocations which are relevant to a specific UE only within a certain active window of that UE's DRX cycle. This enables the UE to periodically go to sleep instead of listening continuously for scheduling commands. The purpose of the DRX concept is to improve the UE's energy efficiency; since any given UE typically is not scheduled continuously there would be some natural periods of inactivity. By scheduling periodic inactivity periods the eNB allows the UE to de-power some of its hardware and ongoing processing and thereby extend the time over which the UE's limited power source is sufficient.

In general the DRX mechanism uses a periodic DRX cycle that is composed of two fixed parts: an active part and a sleep part. The active part, which LTE terms Active time, is when the UE is to be 'awake' and actively listening to see if the network is sending a PDCCH which schedules the UE for DL and/or UL radio resources. The sleep part, which TE terms the DRX opportunity, is the time the UE might be able to operate in a reduced-power/sleep mode (but there may at times be some scheduled radio resources or ongoing HARQ processes that extends into the DRX opportunity). The convention in LTE at least is that the DRX cycle always begins with an active part, followed by the sleep part after which the cycle begins anew. For the cases noted above in which a scheduled resource or some HARQ process keeps the UE from entering its sleep mode at the usual time given by the DRX cycle, the UE simply extends the active part and correspondingly reduces its sleep part so the next DRX cycle begins on time.

The UE and the network have timers to track the DRX. In LTE the network configures the specific DRX cycle (length, start times) for the UEs. For example, a long DRX might be DRX cycle=640 ms; on duration=10 ms; inactivity timer=5 ms. This DRX configuration would reduce the nominal activity time for the UE to $\frac{1}{64}$, (1.56%) as compared to continuous active DL reception or listening. Other radio access technologies use a similar concept which allows the UE to functionally 'sleep' for purposes of extending the time over which the radio can operate from its limited power supply. In theory and practice the DRX enables the UE to remain in a power saving mode for most of the time outside heavy activity periods where UE is scheduled continuously.

LTE Release 10 (LTE-A) uses carrier aggregation, in which the whole system bandwidth is divided into multiple component carriers. Since LTE-A contemplates many more network access nodes of various varieties (for example, conventional cells termed macro cells, pico/femto cells/home eNBs, remote radioheads and repeaters) it has also introduced a mechanism to mitigate interference among them, termed enhanced inter-cell interference coordination eICIC. In this technique one cell coordinates with its neighbor cells to avoid interfering transmissions. One aspect of eICIC in LTE Release 10 is almost-blank subframes (ABS), in which a network node transmits nothing except the common reference signals used for measurements (and in some cases also essential control information like synchronization, paging, or system information) but never any unicast DL user data.

In general an eNB transmits its ABSs according to a known pattern and the transmission of the eNB during the ABSs should cause little if any interference to transmissions of neighboring eNBs. The eICIC concept is used for both macro and pico/femto eNBs. A femto eNB may coordinate its transmissions with the overlay macro eNB in order to allow macro user devices close to the femto eNB to experience less interference during the femto eNB's ABS transmissions. Or a macro eNB coordinates its own ABS transmissions with a nearby pico eNB so that the smaller interference from the macro eNB's ABSs allows user devices within a larger area to find and connect to the pico eNB. The ABSs in these coordinated patterns are sent with CRSs, which the user devices use for channel measurement purposes. When eICIC is in use the user device may be instructed to restrict its measurements of the serving cell or of neighbor cells to the configured ABSs. It is also possible to limit the serving cell and neighbor cell measurements according to different patterns.

So the DRX and the eICIC serve widely different purposes: DRX is needed for conserving UE power and is coordinated between the UE and its serving network node; eICIC is needed for making RLM measurements of serving cell and RRM measurements of serving and neighbor cells for handover purposes (for example, RLM measurement restrictions may be used when a small cell and the macro cell interfere with each other and macro cell user is close to the small cell but not able to access the small cell) and is coordinated between adjacent network nodes. It follows that these two procedures are not linked in any way and the inventors see no such linking in the relevant specifications for LTE and LTE-A. The inventors have identified that the eICIC may operate to drastically limit the power savings that the DRX concept enables for a UE. The below teachings restore at least some of the potential power savings at the UE when the DRX is imposed in the presence of measurement restriction patterns due to ABS.

SUMMARY

The foregoing and other problems are overcome, and other advantages are realized, by the use of the exemplary embodiments of this invention.

In a first exemplary embodiment of the invention there is a method comprising: masking an active reception period of a power saving pattern to a measurement period of the serving cell or a neighbor cell interference mitigation pattern such that the masked active reception period repeatedly coincides with the measurement period; and utilizing the masked active reception period for communicating resource allocations between a serving cell and a user equipment.

In a second exemplary embodiment of the invention there is an apparatus comprising at least one processor; and at least one memory including computer program code. In this embodiment the at least one memory and the computer program code is configured, with the at least one processor, to cause the apparatus at least to perform: masking an active reception period of a power saving pattern to a serving or neighbor cell measurement period of an interference mitigation pattern such that the masked active reception period repeatedly coincides with the active measurement period; and utilizing the masked active reception period for communicating resource allocations between a serving cell and a user equipment. For the case in which the apparatus is a serving cell (or one or more components thereof) this communicating of the resource allocations comprises sending the resource allocations to the user equipment; for the case in which the apparatus is a user equipment (or one or more components thereof) this communicating of the resource allocations comprises receiving the resource allocations from the serving cell.

In a third exemplary embodiment of the invention there is a computer readable memory tangibly storing a computer program that is executable by at least one processor. In this embodiment the computer program comprises code for masking an active reception period of a power saving pattern to the serving or a neighbor cell measurement period of an interference mitigation pattern such that the masked active reception period repeatedly coincides with the measurement period.

DETAILED DESCRIPTION

When the DRX procedure was designed for LTE Release 8, the UE was expected to do its measurements only during the Active time. But introducing eICIC in LTE Release-10 means that some or all of the ABS occasions where the UE is instructed to do measurements by the eICIC configuration may fall outside the Active times of the DRX cycle. When this occurs the UE may have to stay awake longer than necessary in order to take its channel measurements in the ABSs which carry the CRSs, meaning the DRX performance is degraded significantly. The eICIC, which gives measurement restriction patterns for the UE to take its RLM/RRM measurements and whose specifications were drawn up after those for the DRX, may assume that there will be at least one such ABS occasion during the DRX Active time but there is no mechanism to assure this outcome. Typically the measurement periods of the eICIC coincide with the ABSs. While in some cases happenstance may align the ABS with the active period of the DRX active time, these teachings detail various exemplary ways to positively assure that outcome. Briefly, when the DRX and eICIC are used together, the DRX active time is masked according to the measurement restriction pattern (which is more generally termed a serving or neighbor cell interference mitigation pattern). The result is that the UE is allowed to wake up only when there is time alignment between the DRX Active time and an ABS.

Figure 1A:
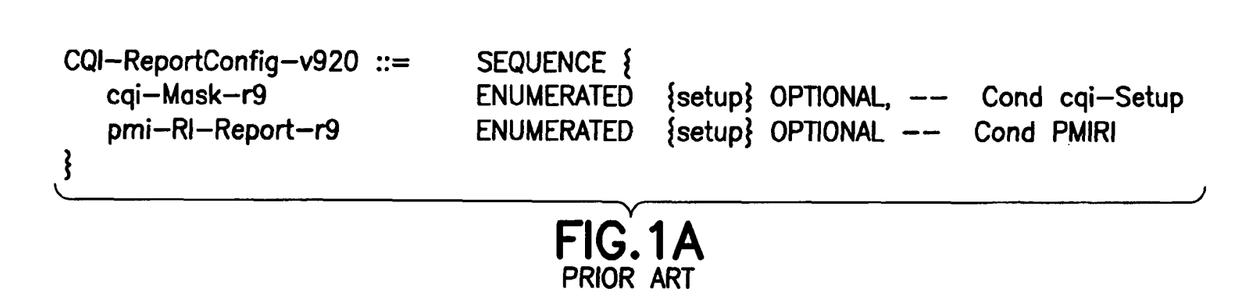
FIG. 1A is a prior art variable for masking transmission of CQI reports according to a DRX cycle as set forth at 3GPP TS 36.321 v10.2.0 (2011-06) and 36.133 v10.3.0 (not yet complete).

There are some prior art uses of masking for the DRX. For example, the UE's transmissions of CQI reports can be masked according to its DRX Active time pattern. FIG. 1 shows the variable cqi-Mask-r9 which is in 3GPP RRC specification TS 36.133. This variable cqi-Mask-r9 is defined such that when used, the UE is required to send CQI/PMI/RI reports only during the Active time of the DRX cycle, never during the DRX opportunity.

Figure 1B:
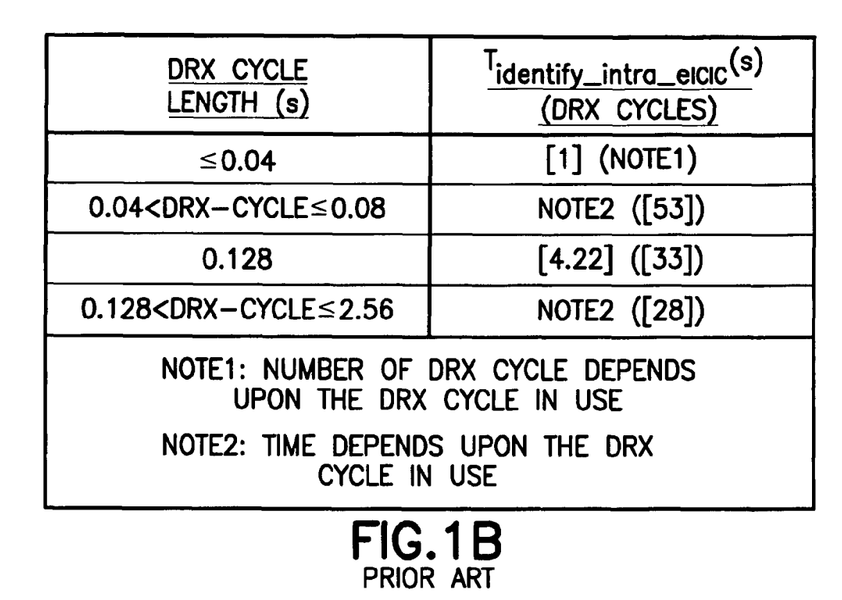
FIG. 1B is a prior art table 8.1.2.8.1.2-1 from 3GPP TS 36.133 v10.3.0 which gives the current time restrictions for identifying a newly detectable FDD intra-frequency cell during the DRX.

FIG. 1B is a prior art table 8.1.2.8.1.2-1 taken from the LTE Release 10 radio resource management requirements at 3GPP TS 36.133 v10.3.0 (note that this version of the specification is incomplete for some Rel'10 content as of this writing) which gives the current time restrictions for identifying a newly detectable FDD intra-frequency cell during the DRX. That same specification also provides that for eICIC-restricted measurements during the DRX: "The time domain measurement resource restriction pattern configured for the measured cell indicates at least one subframe per radio frame for performing the RSRP measurement." This means that for the measurements to be possible, the UE has to have at least one measurement occasion for each 10 ms. The cell identification requirements are expected to allow the UE more time to detect a cell when UE is utilizing both eICIC and DRX than when UE is only utilizing DRX or eICIC.

In accordance with an exemplary embodiment, when DRX and eICIC are used together the DRX Active time is masked according to the given measurement restriction pattern(s). This means that the UE is allowed to wake up only during those times when the ABSs and the Active times match. These teachings are not limited only to the LTE-A system though. Since other radio access technologies may use different terminology for the concepts of DRX and eICIC, more generalized terms are power saving pattern and inter-cell interference mitigation pattern, respectively. In that regard the exemplary embodiments detailed further below mask an active reception period of a power saving pattern to an active measurement period of an inter-cell interference mitigation pattern such that the active reception period repeatedly coincides with the active measurement period. The term 'repeatedly' is used to show a purposeful act to assure the active periods coincide rather than an occasional overlap which might occur by happenstance if there is no operational linkage between these patterns.

In certain embodiments below, this masking is done without shortening a sleep opportunity (the DRX opportunity in LTE terminology) of the power saving pattern. This is not to say the DRX opportunity is always fully preserved; it may be that there is a scheduled PDSCH or PUSCH, which are allocated to the UE in a PDCCH sent during its active time, which extend into the UE's DRX opportunity. Or there may be a HARQ process which extends a re-transmission into the UE's DRX opportunity. Those conventional instances may still occur; the relevant point is that in certain embodiments where the DRX opportunity is not shortened it is not shortened due to masking the DRX active period to the eICIC pattern.

Before detailing the various embodiments for how these patterns can be conformed to one another to achieve the coinciding active periods noted above, reference is made to FIG. 2 for illustrating an exemplary radio environment in which these teachings can be practiced to advantage. There is a UE 20 operating in the vicinity of a macro eNB 22 and a femto eNB 26. The typical case for eICIC is that only the femto eNB 26 is utilizing an eICIC pattern and the UE 20, attached to the macro eNB 22, will receive its resource allocations (PDCCHs) from its serving macro eNB 22 during the active time of its DRX. That same UE 20 can take neighbor cell measurements of the femto eNB 26 for mobility purposes by reading the CRS in the ABS transmitted by the femto eNB 26, and report that measurement back to its serving macro eNB 22. Embodiments of these teachings align this UE's DRX active time from the macro eNB 22 with the ABS of the femto eNB 26. This assures the UE 20 operating near the femto eNB 26 and attached to the macro eNB 22 that the femto eNB 26 will not interfere with any PDCCHs the macro eNB 22 sends to the UE 20. Since the femto eNB 26 transmits CRSs both inside and outside the ABSs, the UE 20 can take measurements of the neighbor femto eNB 26 outside the ABSs if it is unable to do so during the overlapped DRX active time and ABS.

Figure 2:
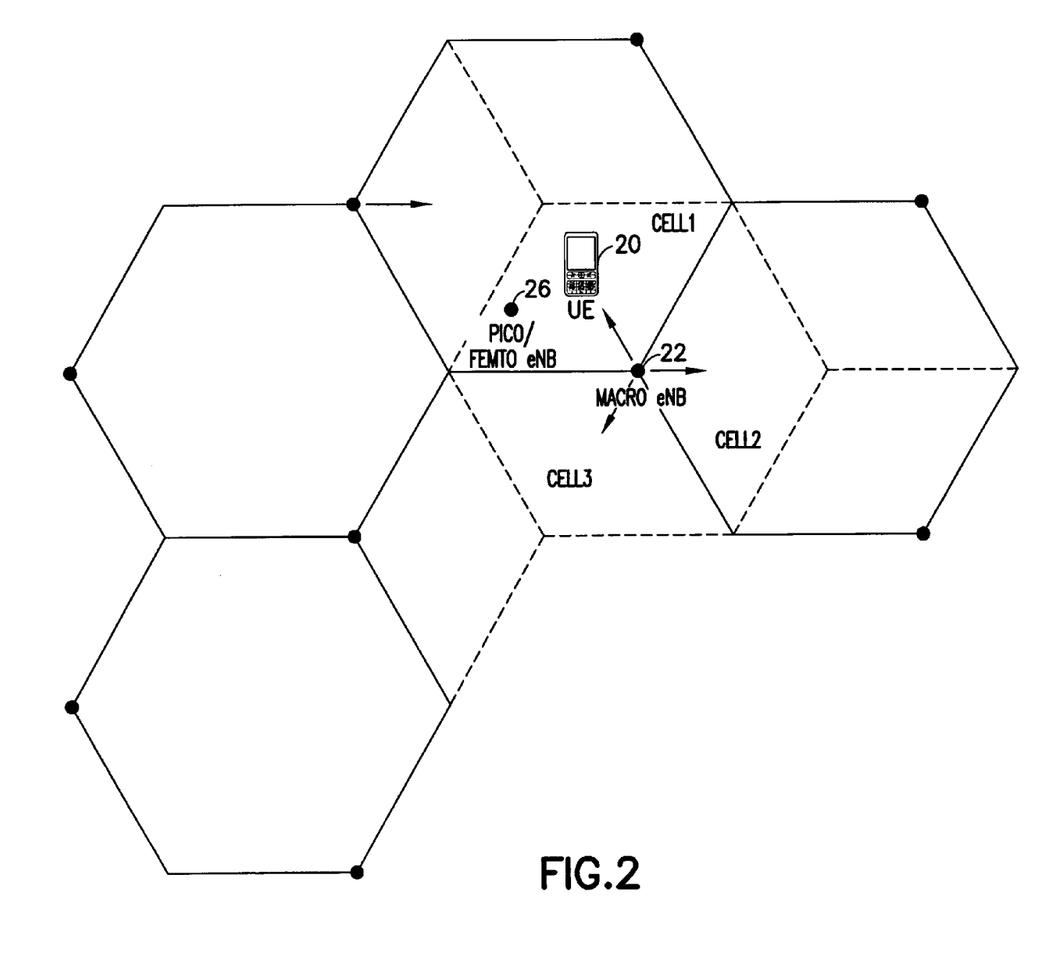
FIG. 2 is a plan view of a conceptual radio environment in which the various exemplary embodiments may be practiced to advantage.

It may be that the macro eNB 22 is transmitting ABSs for eICIC and not the pico eNB 26. An example of this has the UE 20 attached to the pico eNB 26, near the cell edge and ready for handover to the macro eNB 22 but the macro eNB 22 wants to retain the UE 20 connected to the pico eNB 26. In this case the macro eNB 22 can use its ABS to protect the pico eNB 26 so that the UE 20 only measures its serving pico eNB 26 during the ABSs of the macro eNB 22. The UE's signal strength with the pico eNB 26 will remain high since the macro eNB's ABSs cause little interference when the UE 20 measures its serving cell 26, and so a handover is not yet triggered. In this case, embodiments of these teachings have the UE 20 align the DRX active time from the pico eNB 26 with the ABS of the macro eNB 22. The UE 20 will take its neighbor measurements of the macro eNB 22 by reading CRSs transmitted by the macro eNB 22 which may be within or outside of the macro eNB's, according to the UE's best opportunity.

Figure 3:
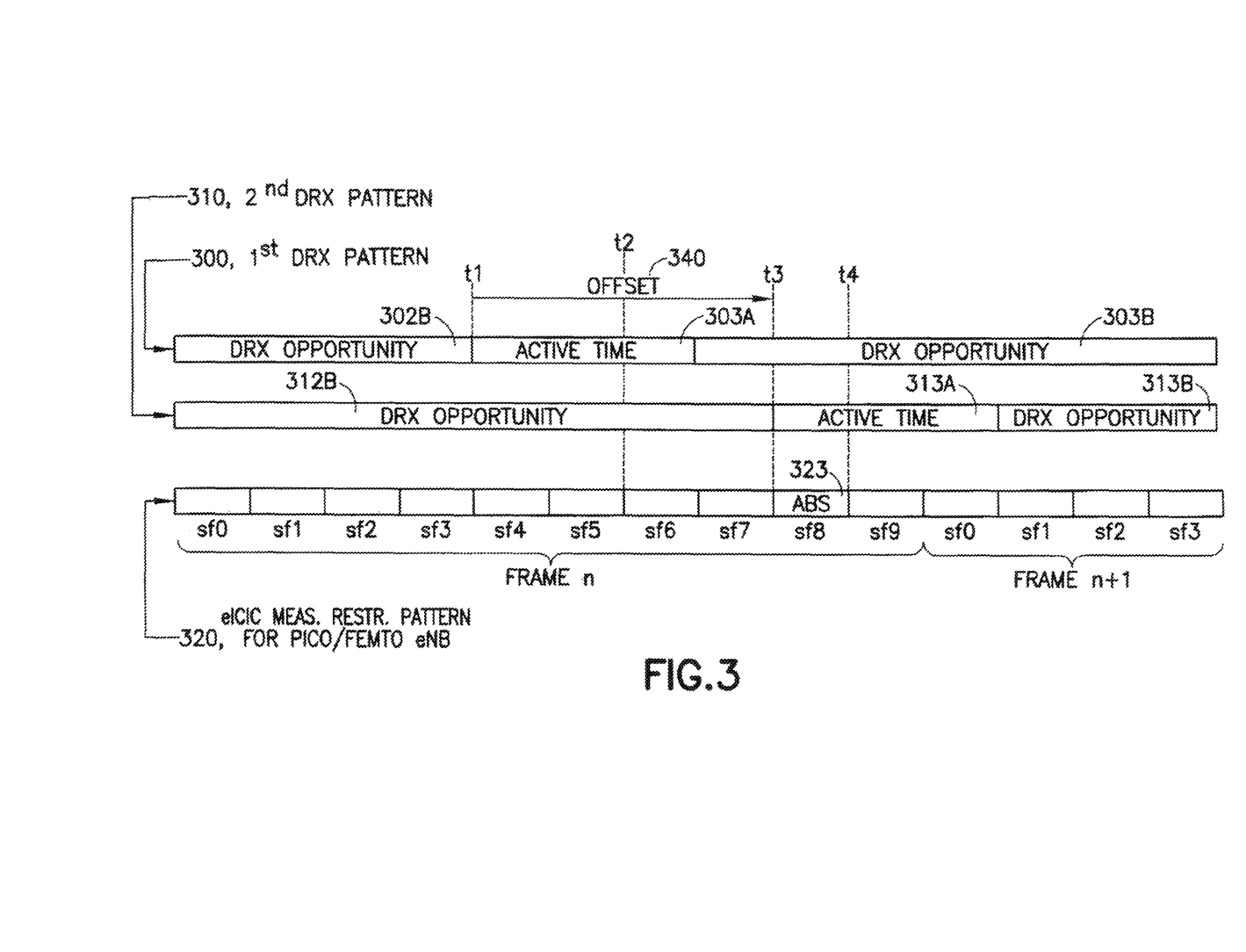
FIG. 3 is a schematic timing diagram of a DRX cycle and its adjustment according to certain embodiments of these teachings to assure an overlap among active periods of the adjusted DRX cycle and ABSs of the eICIC pattern.

Now consider the timing diagram of FIG. 3 which spans two radio frames; frame n and a portion of frame n+1. Subframes of these frames are annotated as sf0, sf1, sf2, etc. There is shown an eICIC measurement restriction pattern 320 for the pico eNB 22 with an ABS 323 (the UE's restricted measurement period) only at sf8 of frame n. This example is not limiting as it may be the macro eNB which has the eICIC measurement restriction pattern which gives measurement occasions for the UE.

There is a first DRX pattern 300 having an active time 303A spanning only sf4, sf5 and sf6 of frame n, and DRX opportunities 302B, 303B in all other illustrated subframes. Assume this first DRX pattern 300 is the one which the serving macro eNB 22 has configured for the UE 20 according to conventional practice. Since the DRX cycle 300 begins with an active period, active time 303A and DRX opportunity 303B are within the same cycle and DRX opportunity 302B is residual from a previous iteration of the same cycle 300. The active period 303A of the first DRX pattern 300 does not coincide with the ABS 323 of the eICIC measurement restriction pattern 320 of the pico eNB 26, and so in this conventional arrangement the UE 20 which enters sleep mode after subframe 6 according to its DRX opportunity 303B would need to wake again for the ABS 323 in subframe 8.

In a general case, it might be possible for the UE to sleep during the intervening subframes between the ABS 333, but in this particular example case the sleep time would consist of only a single subframe sf7, which might not allow any power saving for the UE since turning a receiver on/off also requires some (small) time which might be consumed entirely during sf7. So in the FIG. 3 example with the first DRX pattern 300 the UE 20 would likely extend the time it stays fully powered up to subframe 8, effectively extending its DRX active time 303A and reducing the time it has for powering down in the DRX opportunity 303B.

In the example above, the DRX active period is not masked to the ABS but the UE 20 may simply extend the time it stays awake after the active time 303A to overlap it, which results in a reduction to the DRX/sleep opportunity 303B. Below are three non-limiting embodiments of masking the DRX active period to the ABS to assure the DRX active time overlaps with the relevant ABS 323 while preserving the potential for more sleep time at the UE.

In a first embodiment the UE wakes up from its DRX opportunity only if an ABS measurement subframe coincides with the Active time. Otherwise, the UE shall continue the DRX opportunity until such time when it can determine that there will be a measurement subframe during an Active time. In one implementation of this first embodiment the UE 20 continues its DRX opportunity until there is an active time coinciding with an ABS. With reference to FIG. 3, if we consider the second DRX pattern 310 as merely a different cycle of the first DRX pattern 300 but overlaid on different frames, a UE 20 seeing the DRX active time 303A align as shown for DRX cycle 300 would not wake as scheduled at t1 for its active time 303A since there is no overlap with an ABS 323, but when the DRX active time 313A aligns as shown for cycle 310 the UE 20 would wake at time t3 since the ABS 323 overlaps. In the cycle 300 the UE 20 would simply continue in sleep mode until a cycle 310 arises in which there is an overlap between the ABS 323 and the DRX active time as the network configured that DRX for the UE 20, without making any adjustments of its own to that configured DRX pattern.

Another implementation of this first embodiment uses something less than the full masking of the first implementation. In this case, instead of the UE 20 retaining the network-configured DRX start time at t1 and sf5, it would postpone the DRX active time on-duration start time until there was an overlap of the active time and the ABS. FIG. 3 illustrates two examples of the UE 20 with DRX pattern 300 and needing to overlap its active time with the ABS 323. If the understanding between the UE 20 and its serving node (macro eNB 22 in this example) is that the DRX active period will begin only when there is an ABS, then the result is shown as the second DRX pattern 310 at FIG. 3; the start of the active time 313A on-duration is delayed from t1 to t3 so that the ABS aligns with the first subframe of the active time 313A and the network-configured duration of the active time 313A is retained. In FIG. 3 this is an offset 340 of four subframes and the network-configured active time duration is three subframes. If the understanding between the UE 20 and its serving node is that the last subframe of the DRX active period will be aligned to the ABS, then the start of the active time 303A on-duration of the network-configured DRX will in FIG. 3 be delayed from t1 to t2 and the active time duration will run from t2 to t4. In FIG. 3 this is an offset of two subframes. So long as there is a common understanding how the alignment is to occur, any subframe of the active time (first, last, or some other subframe of the active time) can be masked to the ABS. In both these examples, the UE 20 would operate with the DRX cycle which the network configured for it so long as there is no eICIC in operation, but anytime there is an operative eICIC the UE 20 would mask the active time 303A as detailed in the above examples.

One way to implement this postponement of the active time on-duration is with a new DRX timer, which we term for convenience ABSTimer. This ABSTimer is started when the current subframe is an ABS subframe according to the UE-configured pattern, and stopped when the current subframe is not an ABS subframe according to the UE-configured pattern. So using the FIG. 3 example the new ABSTimer runs only during sf8 among all of the illustrated subframes. For the LTE-A system, the specifications for the DRX process description could then be modified from that currently at 3GPP TS 36.321 v.10.2.0, section 5.7: Discontinuous Reception (DRX) to read as follows, in which the italicized portions are added herein ('measurement subframe' refers to the ABS):

When a DRX cycle is configured, the Active Time includes the time while:
ABSTimer is not running and (onDurationTimer or drx-InactivityTimer or drx-RetransmissionTimer or mac-ContentionResolutionTimer (as described in subclause 5.1.5) is running); or
When DRX is configured, the UE shall for each subframe:
if the current subframe is a measurement subframe according to configured MeasSubFramePattern:
stop the ABSTimer.
else:
start the ABSTimer.
if a HARQ RTT Timer expires in this subframe and the data in the soft buffer of the corresponding HARQ process was not successfully decoded:

The second embodiment is similar in result to the on-duration postponement of the first embodiment, but instead of a new timer the start of the active time on-duration is postponed until the next available measurement/ABS subframe (as indicated by the eICIC measurement pattern) by changing the DRX Offset parameter each time the active time on-duration is postponed. The DRX Offset parameter is one of the DRX configuration parameters which the network provides to the UE 20. The DRX offset could be changed according to a (semi-static) set of rules, for example so that UE would ensure that the ABS occasion happens at the first or last subframe of the active time on duration.

Since the second embodiment in which the UE 20 modifies the result of applying the DRX Offset parameter might lead to a mismatch between the UE 20 and the eNB 22, 26, in a particular but non-limiting implementation the UE 20 will periodically signal the change it makes to the DRX Offset back to its serving eNB. In various implementations the UE 20 sends this signaling via a MAC control element, or via PHY signaling, or via RRC signaling. This change to the DRX Offset parameter is shown in FIG. 3 as the additional offset 340. Similar to the postponement detailed in the first embodiment, the above examples have the offset 340 as two subframes or up to four subframes, depending on the UE and eNB's common understanding of which portion of the (postponed) active time 303A is to align with the ABS 323. In other implementations the UE need not signal the change and its serving eNB can simply track what the active time alignment will be since the eNB knows its neighbor cell eICIC patterns as well as the DRX it configured for the UE.

One way to implement the postponement of the active time on-duration according to the second embodiment is with a new DRX parameter ABSOffset that is applied on top of the existing drxStartOffset as follows:
If the Short DRX Cycle is used and [(SFN*10)+subframe number] modulo (shortDRX-Cycle)=(drxStartOffset+ABSOffset) modulo (shortDRX-Cycle); or
if the Long DRX Cycle is used and [(SFN*10)+subframe number] modulo (longDRX-Cycle)=drxStartOffset+ABSOffset:
start onDurationTimer.
The ABSOffset parameter would be set when the DRX start is extended. In this case the offset 340 represents the ABSOffset since it is applied over the network-configured DRX Offset value.

In a third embodiment, anytime the DRX and the eICIC are both used, the DRX is automatically matched to the measurement restriction pattern (or patterns if the UE is utilizing measurement restriction patterns for multiple network nodes). For example, once the UE with a configured DRX cycle sees that eICIC is made operational in a cell, the UE will automatically change its DRX cycle to 40 ms, with the on-duration of the active time modified to occur at each measurement occasion according to the signaled serving cell and neighbor cell measurement restriction patterns. In case there are multiple separated measurement occasions within the measurement restriction pattern, the UE would wake up at every such occasion. In this example the short DRX cycle (if configured) is also set to 40 ms, effectively disabling it, but other DRX parameters signaled by the network to the UE stay unchanged. The 40 ms DRX cycle is specific for an LTE-A implementation; more generally there is a default power saving cycle length which the UE adopts in this third embodiment. If at some time eICIC measurement restrictions are disabled for this UE, the DRX cycle and on-duration values revert back to those given by the DRX parameters which the network signaled when first configuring the DRX for the UE.

This third embodiment may be implemented with a new absDRX-Cycle variable which the UE uses as follows:
if drx-InactivityTimer expires or a DRX Command MAC control element is received in this subframe:
if the absDRX-Cycle is configured:
use the absDRX-Cycle;
else if the Short DRX cycle is configured:
start or restart drxShortCycleTimer;
use the Short DRX Cycle.

else:
    use the Long DRX cycle.
if drxShortCycleTimer expires in this subframe and abs-DRX-Cycle is not configured:
    use the Long DRX cycle.
if UE has either measSubframePatternPCell or MeasSubframePatternConfigNeigh-r10 for PCell frequency configured:
    use Long DRX Cycle according to value sf40 and set absDRX-Cycle to contain "1" for each occurrence of "1" in the IE measSubframePatternPCell or IE meas-SubframePatternConfigNeigh-r10 for the PCell frequency.
if the absDRX-Cycle is used and contains "1" at position [(SFN*10)+subframe number] modulo 40
    start onDurationTimer.
if the absDRX-Cycle is used and contains "0" at position [(SFN*10)+subframe number] modulo 40
    stop onDurationTimer.

One technical effect of these teachings is that they enable a more efficient use of DRX when eICIC is used at the same time. These embodiments are straightforward too implement because they are compatible with existing DRX and eICIC procedures with only minor adaptation.

Figure 4:
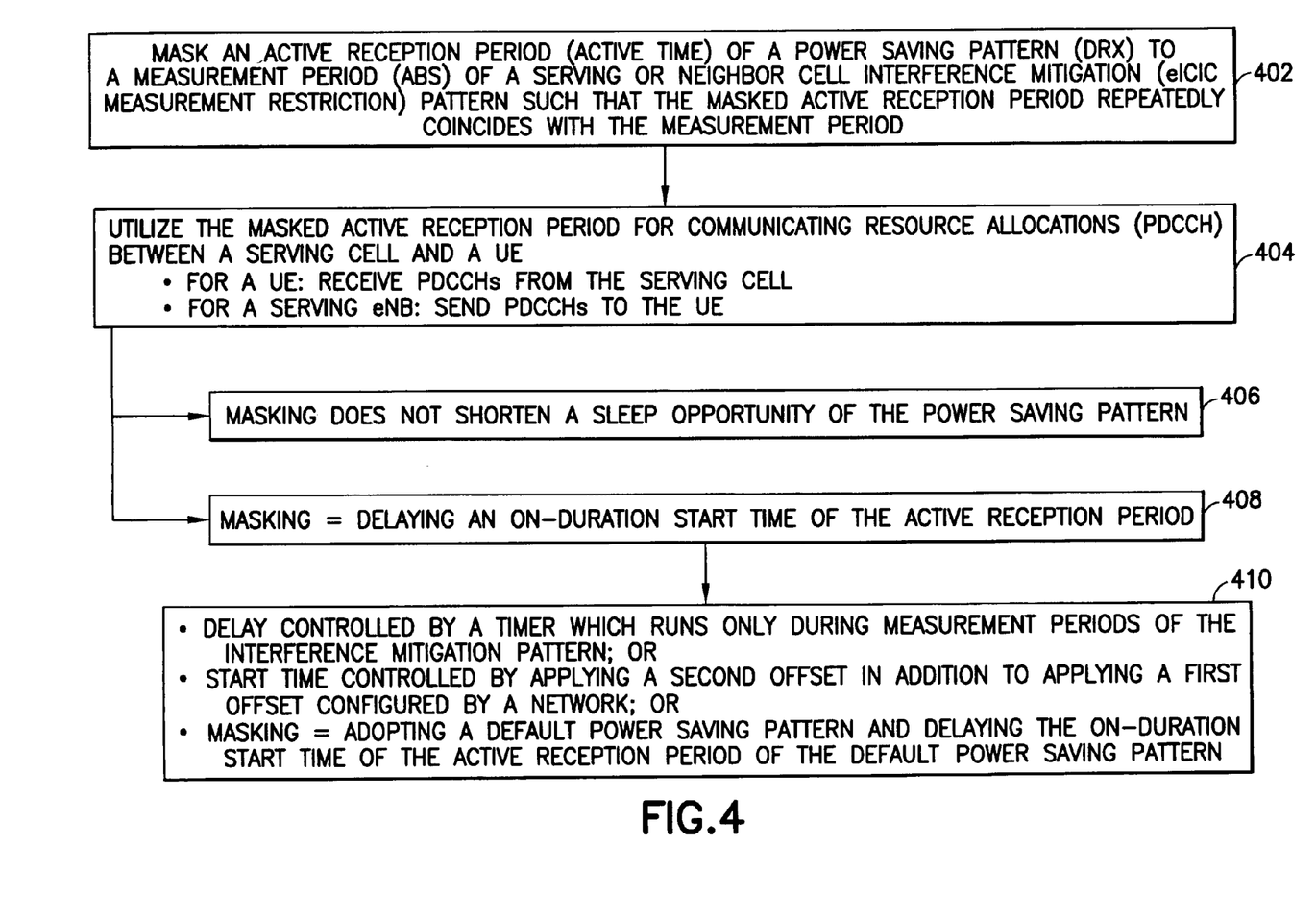
FIG. 4 is a logic flow diagram illustrating the operation of a method, and a result of execution of computer program instructions embodied on a computer readable memory, for practicing exemplary embodiments of these teachings.

FIG. 4 is a logic flow diagram which may be considered to illustrate the operation of a method, and a result of execution of a computer program stored in a computer readable memory, and a specific manner in which components of an electronic device are configured to cause that electronic device to operate. The various blocks shown in each of FIG. 4 may also be considered as a plurality of coupled logic circuit elements constructed to carry out the associated function(s), or specific result of strings of computer program code stored in a memory.

Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

FIG. 4 details particular exemplary embodiments of the invention from the perspective of the UE or of the pico/femto or macro eNB (whichever is the serving cell) which also tracks the UE's active times and DRX opportunities to know when it may send a PDCCH. FIG. 4 may be implemented by the entire UE/eNB or by one or more components thereof, more generally termed an apparatus. At block 402 of FIG. 4 the UE/eNB/apparatus masks an active reception period of a power saving pattern to a serving cell or neighbor cell measurement period of an interference mitigation pattern such that the masked active reception period repeatedly coincides with the measurement period. Then at block 404 the apparatus utilizes the masked active reception period for communicating resource allocations between a serving cell and a user equipment.

For the case FIG. 4 is implemented by a UE, the utilizing and communicating at block 404 may be implemented by receiving PDCCHs from a serving cell. For the case FIG. 4 is implemented by an eNB or other network access node, the utilizing and communicating at block 404 may be implemented by sending PDCCHs to a user equipment. For the LTE-A examples above, the active reception period of the power saving pattern is an active time of a discontinuous reception DRX cycle, and the measurement period of the interference mitigation pattern is an almost-blank subframe ABS of an enhanced intercell interference coordination eICIC measurement restriction pattern.

Further portions of FIG. 4 are optional and may or may not be combined with one another in various embodiments. Block 406 describes certain embodiments in which the masking of block 402 is done without shortening a sleep opportunity of the power saving pattern.

Block 408 details that masking the active reception period to the measurement period comprises delaying an on-duration start time of the active reception period. Block 410 gives the three embodiments above for how the delay of block 408 might be implemented:
    the on-duration start time is controlled by a timer which runs only during measurement periods of the interference mitigation pattern; or
    the on-duration start time is controlled by applying a second offset generated by a user equipment in addition to applying a first offset configured by a network; or
    the masking of block 402 comprises adopting a default power saving pattern and delaying the on-duration start time of the active reception period of the default power saving pattern.

Figure 5:
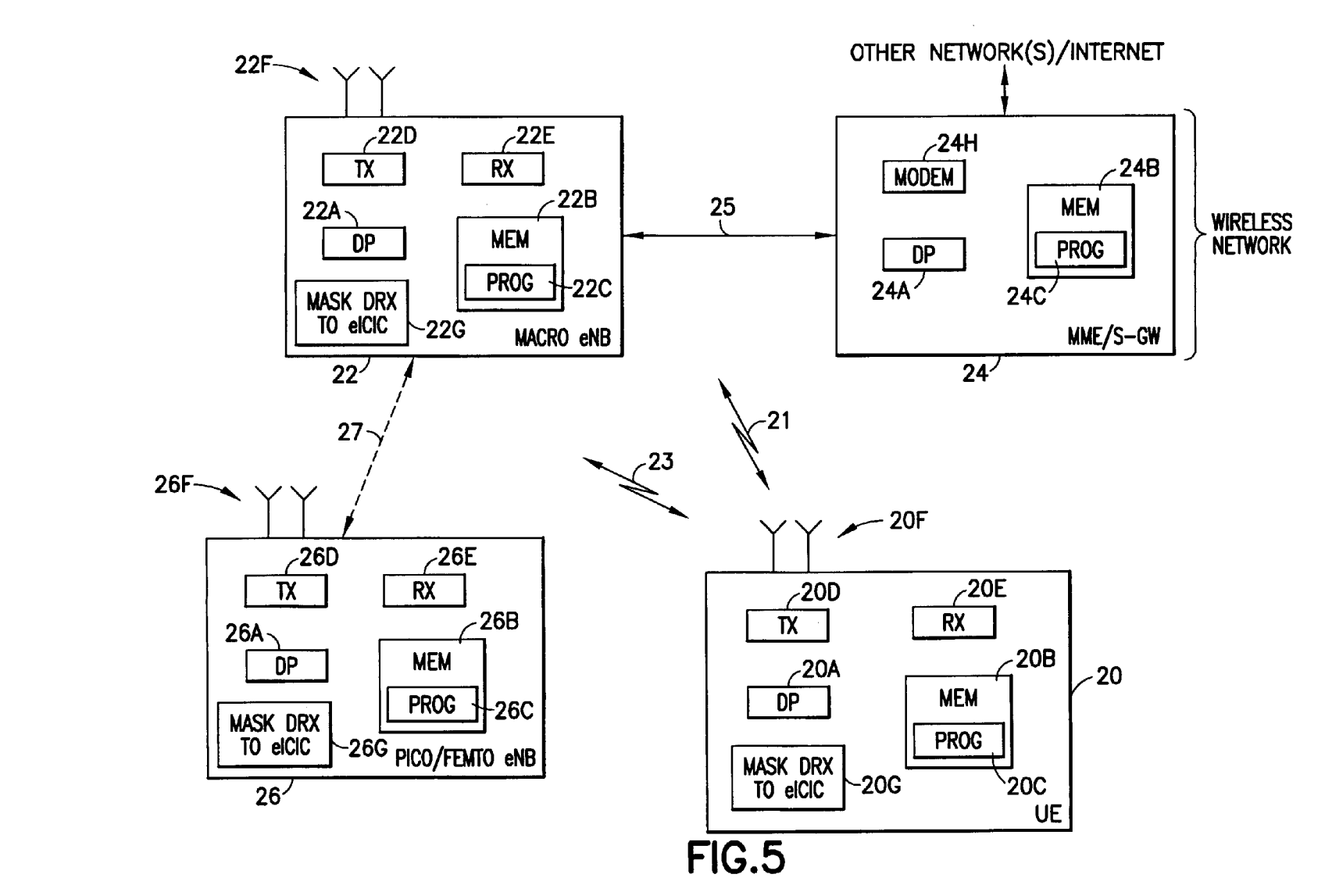
FIG. 5 is a simplified block diagram of some of the devices shown at FIG. 2 which are exemplary electronic devices suitable for use in practicing the exemplary embodiments of this invention.

Reference is now made to FIG. 5 for illustrating a simplified block diagram of various electronic devices and apparatus that are suitable for use in practicing the exemplary embodiments of this invention. In FIG. 5 there is a first network access node/macro eNB 22 coupled via an X2 interface 27 to a second network access node/pico eNB 26 (or some other type of interface 27 if the second network access node is a femto eNB), which are adapted for communication over respective wireless links 21, 23 with an apparatus 20 such as mobile terminals or termed more generally as a user equipment UE. The macro eNB 22 may be further communicatively coupled via link 25 to further networks (e.g., a publicly switched telephone network PSTN and/or a data communications network/Internet), possibly via a higher network node such as a mobility management entity/serving gateway MME/S-GW 24 in the case of the LTE system.

The UE 20 includes processing means such as at least one data processor (DP) 20A, storing means such as at least one computer-readable memory (MEM) 20B storing at least one computer program (PROG) 20C, communicating means such as a transmitter TX 20D and a receiver RX 20E for bidirectional wireless communications with the macro eNB 22 and with the pico/femto eNB 26 via one or more antennas 20F. Within the memory 20B of the first UE 20 is also a computer program for masking the active period of the DRX to the ABSs of the eICIC measurement restriction pattern as is detailed above in various embodiments.

The macro eNB 22 also includes processing means such as at least one data processor (DP) 22A, storing means such as at least one computer-readable memory (MEM) 22B storing at least one computer program (PROG) 22C, and communicating means such as a transmitter TX 22D and a receiver RX 22E for bidirectional wireless communications with its associated user devices 20 via one or more antennas 22F and a modem. The macro eNB 22 also has stored in its memory at 22G software to also mask the UE's DRX active period to the ABSs of the eICIC measurement restriction pattern so as to track when the UE is awake and when it is in sleep mode. The pico/femto eNB 26 is similarly functional with blocks 26A, 26B, 26C, 26D, 26E, 26F and 26G.

For completeness the MME/S-GW 24 is also shown to include a DP 24A, and a MEM 24B storing a PROG 24C, and additionally a modem 24H for communicating with at least the macro eNB 22. While not particularly illustrated for the UE 20 or eNBs 22, 26, those devices are also assumed to include as part of their wireless communicating means a modem which may in one exemplary but non limiting embodiment be inbuilt on an RF front end chip so as to carry the respective TX 20D/22D/26D and RX 20E/22E/26E.

At least one of the PROGs 20C, 22C, 26C in the UE 20 and in the macro and pico/femto eNBs 22, 26 is assumed to include program instructions that, when executed by the associated DP 20A, 22A, 26A, enable the device to operate in accordance with the exemplary embodiments of this invention as detailed more fully above. In this regard the exemplary embodiments of this invention may be implemented at least in part by computer software stored on the MEM 20B, 22B, 26B which is executable by the DP 20A, 22A, 26A of the respective devices 20, 22, 26; or by hardware; or by a combination of tangibly stored software and hardware (and tangibly stored firmware). Electronic devices implementing these aspects of the invention need not be the entire UE 20, or macro eNB 22, or pico/femto eNB 26, but exemplary embodiments may be implemented by one or more components of same such as the above described tangibly stored software, hardware, firmware and DP, or a system on a chip SOC or an application specific integrated circuit ASIC or a digital signal processor DSP or a modem or a subscriber identity module commonly referred to as a SIM card.

Various embodiments of the UE 20 can include, but are not limited to: cellular telephones; data cards, USB dongles, personal portable digital devices having wireless communication capabilities including but not limited to laptop/palmtop/tablet computers, digital cameras and music devices, and Internet appliances.

Various embodiments of the computer readable MEM 20B, 22B, 26B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 20A, 22A, 26A include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant arts in view of the foregoing description. While the exemplary embodiments have been described above in the context of the LTE and LTE-A systems, it should be appreciated that the exemplary embodiments of this invention are not limited for use with only this one particular type of wireless communication system, and that they may be used to advantage in other wireless communication systems such as for example UTRAN, WCDMA and others as adapted for power saving active/sleep periods for a UE.

Some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. A method, comprising:
   masking an active period of a discontinuous reception (DRX) cycle of a user equipment to an almost-blank subframe (ABS) of an enhanced inter-cell interference coordination (eICIC) measurement restriction pattern such that the masked active period repeatedly coincides with the measurement period; and
   utilizing the masked active reception period for communicating resource allocations between a serving cell and the user equipment.

2. The method according to claim 1, in which the masking is done without shortening a sleep opportunity of the discontinuous reception (DRX) cycle of the user equipment.

3. The method according to claim 1, in which masking the active period to the almost-blank subframe (ABS) comprises delaying an on-duration start time of the active period.

4. The method according to claim 3, in which the on-duration start time is controlled by a timer which runs only during almost-blank subframe (ABS) of the enhanced inter-cell interference coordination (eICIC) measurement restriction pattern.

5. The method according to claim 3, in which the on-duration start time is controlled by applying a second offset generated by the user equipment executing the method in addition to applying a first offset configured by the serving cell.

6. The method according to claim 3, in which masking the active period to the almost-blank subframe (ABS) comprises adopting a default power saving pattern and delaying the on-duration start time of the active period of the default power saving pattern.

7. The method according to claim 1, in which the method is executed by the user equipment, and utilizing the masked active period for communicating resource allocations comprises the user equipment tuning a receiver to receive from the serving cell a physical downlink control channel.

8. The method according to claim 1, in which the method is executed by the serving cell, and utilizing the masked active period for communicating resource allocations comprises the serving cell transmitting to the user equipment a physical downlink control channel.

9. An apparatus comprising
   at least one processor; and
   at least one memory including computer program code;
   in which the at least one memory and the computer program code is configured, with the at least one processor, to cause the apparatus at least to perform:
   masking an active period of a discontinuous reception (DRX) cycle of a user equipment to an almost-blank subframe (ABS) of an enhanced inter-cell interference coordination (eICIC) measurement restriction pattern such that the masked active period repeatedly coincides with the measurement period; and
   utilizing the masked active reception period for communicating resource allocations between a serving cell and the user equipment by either sending the resource allocations to the user equipment or receiving the resource allocations from the serving cell.

10. The apparatus according to claim 9, in which the masking is done without shortening a sleep opportunity of the discontinuous reception (DRX) cycle of the user equipment.

11. The apparatus according to claim 9, in which masking the active period to the almost-blank subframe (ABS) comprises delaying an on-duration start time of the active period.

12. The apparatus according to claim 11, in which the on-duration start time is controlled by a timer which runs only during almost-blank subframe (ABS) of the enhanced inter-cell interference coordination (eICIC) measurement restriction pattern.

13. The apparatus according to claim 11, in which the on-duration start time is controlled by applying a second offset generated by the user equipment in addition to applying a first offset configured by the serving cell.

14. The apparatus according to claim 11, in which masking the active period to the almost-blank subframe (ABS) comprises adopting a default power saving pattern and delaying the on-duration start time of the active period of the default power saving pattern.

15. A memory tangibly storing a computer program that is executable by at least one processor, in which the computer program comprises:
 code for masking an active period of a discontinuous reception (DRX) cycle of a user equipment to an almost-blank subframe (ABS) of an enhanced inter-cell interference coordination (eICIC) measurement restriction pattern such that the masked active period repeatedly coincides with the measurement period; and
 code for utilizing the masked active reception period for communicating resource allocations between a serving cell and the user equipment.

16. The memory according to claim 15, in which masking the active period to the almost-blank subframe (ABS) comprises delaying an on-duration start time of the active period.

17. The memory according to claim 16, in which:
 the on-duration start time is controlled by a timer which runs only during almost-blank subframe (ABS) of the enhanced inter-cell interference coordination (eICIC) measurement restriction pattern; or
 the on-duration start time is controlled by applying a second offset generated by a user equipment in addition to applying a first offset configured by a network; or
 masking the active period to the almost-blank subframe (ABS) comprises adopting a default power saving pattern and delaying the on-duration start time of the active period of the default power saving pattern.

18. The method according to claim 1, in which the masking is done by delaying an on-duration start time of the active period without shortening a sleep opportunity of the discontinuous reception (DRX) cycle of the user equipment.

19. The apparatus according to claim 9, in which the masking is done by delaying an on-duration start time of the active period without shortening a sleep opportunity of the discontinuous reception (DRX) cycle of the user equipment.

20. The memory according to claim 15, in which the masking is done by delaying an on-duration start time of the active period without shortening a sleep opportunity of the discontinuous reception (DRX) cycle of the user equipment.

\* \* \* \* \*